(12) United States Patent
Naora

(10) Patent No.: US 12,665,128 B2
(45) Date of Patent: Jun. 23, 2026

(54) MULTILAYER CERAMIC CAPACITOR

(71) Applicant: Murata Manufacturing Co., Ltd., Nagaokakyo (JP)

(72) Inventor: Masashi Naora, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 106 days.

(21) Appl. No.: 18/617,689

(22) Filed: Mar. 27, 2024

(65) Prior Publication Data

US 2025/0279238 A1 Sep. 4, 2025

(30) Foreign Application Priority Data

Mar. 4, 2024 (JP) ................................. 2024-031811

(51) Int. Cl.
| | |
|---|---|
| *H01G 2/10* | (2006.01) |
| *H01G 4/12* | (2006.01) |
| *H01G 4/232* | (2006.01) |
| *H01G 4/30* | (2006.01) |

(52) U.S. Cl.
CPC ............. *H01G 2/10* (2013.01); *H01G 4/1227* (2013.01); *H01G 4/2325* (2013.01); *H01G 4/30* (2013.01)

(58) Field of Classification Search
CPC .......... H01G 4/30; H01G 4/1227; H01G 2/10; H10G 4/2325

USPC ......... 361/301.3, 301.4, 321.1, 321.3, 321.4, 361/321.5
See application file for complete search history.

(56) References Cited

U.S. PATENT DOCUMENTS

| | | | | |
|---|---|---|---|---|
| 5,866,196 A | * | 2/1999 | Ueno ..................... | H01C 1/142 |
| | | | | 29/613 |
| 10,366,834 B1 | * | 7/2019 | Lee ......................... | H01G 4/012 |
| 2019/0103224 A1 | * | 4/2019 | Han ..................... | H01G 4/2325 |
| 2023/0207213 A1 | | 6/2023 | Cho et al. | |

FOREIGN PATENT DOCUMENTS

| | | |
|---|---|---|
| JP | 2001-237137 A | 8/2001 |
| KR | 20230101358 A | 7/2023 |

* cited by examiner

*Primary Examiner* — Arun Ramaswamy
(74) *Attorney, Agent, or Firm* — Keating & Bennett, LLP

(57) ABSTRACT

A multilayer ceramic capacitor includes a multilayer body including an inner layer portion including dielectric layers and internal electrode layers that are laminated, two main surfaces opposed to each other in a lamination direction, two lateral surfaces opposed to each other in a width direction intersecting the lamination direction, two end surfaces opposed to each other in a length direction intersecting the lamination direction and the width direction, and two outer layer portions on both sides of the inner layer portion in the lamination direction, and external electrodes on the two end surfaces. The multilayer body includes an exposed surface that is not covered by the external electrodes. The exposed surface includes a metal oxide coating region coated with a metal oxide which is different from a component of the plurality of dielectric layers.

11 Claims, 4 Drawing Sheets

MULTILAYER CERAMIC CAPACITOR

CROSS REFERENCE TO RELATED APPLICATIONS

This application claims the benefit of priority to Japanese Patent Application No. 2024-031811 filed on Mar. 4, 2024. The entire contents of this application are hereby incorporated herein by reference.

BACKGROUND OF THE INVENTION

1. Field of the Invention

The present invention relates to multilayer ceramic capacitors.

2. Description of the Related Art

Multilayer ceramic capacitors each include a multilayer body including a ceramic sintered body made of a dielectric material such as barium titanate. Such a multilayer body includes a plurality of layer-shaped internal electrodes made of a noble metal material such as Ag or an Ag—Pd alloy or a base metal material such as Ni with a ceramic layer (dielectric layer) interposed therebetween. The internal electrodes extend alternately toward one surface and the other surface, and are also exposed alternately at the one end surface and the other end surface. The internal electrodes exposed at the one end surface are electrically connected to one external electrode on the one end surface, and the internal electrodes exposed at the other end surface are electrically connected to the other external electrode on the other end surface (for example, refer to Japanese Unexamined Patent Application Publication No. 2001-237137).

The external electrodes of such a multilayer ceramic capacitor each include a plurality of metal components including a metal which is the same as or alloyed with the material of the internal electrodes, and a glass component, and are bonded to a wiring substrate via a conductive resin adhesive. Here, when the area occupation ratio of the metal component to the cross-sectional area of each of the external electrodes is 60% to 95%, the external electrodes can be mounted on the wiring substrate with high reliability at low cost without using solder.

However, voids (pores) exist in the dielectric layers of the multilayer body, and moisture may enter the internal electrodes through such voids to cause a failure. In a general multilayer ceramic capacitor such as the one disclosed in Japanese Unexamined Patent Application Publication No. 2001-237137, a portion of the outer surface of the multilayer body is exposed to the outside air without being covered by the external electrodes. When one of such voids penetrate from the exposed surface to one of the internal electrode, moisture may enter the internal electrode through the void to cause a failure (short circuit).

SUMMARY OF THE INVENTION

Example embodiments of the present invention provide multilayer ceramic capacitors that are each able to reduce or prevent moisture from entering the inside of a multilayer body.

An example embodiment of the present invention provides a multilayer ceramic capacitor including a multilayer body including an inner layer portion including a plurality of dielectric layers and a plurality of internal electrode layers that are laminated, two main surfaces opposed to each other in a lamination direction, two lateral surfaces opposed to each other in a width direction intersecting the lamination direction, two end surfaces opposed to each other in a length direction intersecting the lamination direction and the width direction, and two outer layer portions on both sides of the inner layer portion in the lamination direction, and external electrodes respectively on each of the two end surfaces of the multilayer body, in which the multilayer body includes an exposed surface that is uncovered by the external electrodes, and the exposed surface includes a metal oxide coating region coated with a metal oxide which is different from a component of the plurality of dielectric layers.

According to example embodiments of the present invention, it is possible to provide multilayer ceramic capacitors that are each able to reduce or prevent moisture from entering the inside of a multilayer body.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail with reference to the drawings.

Figure 1:
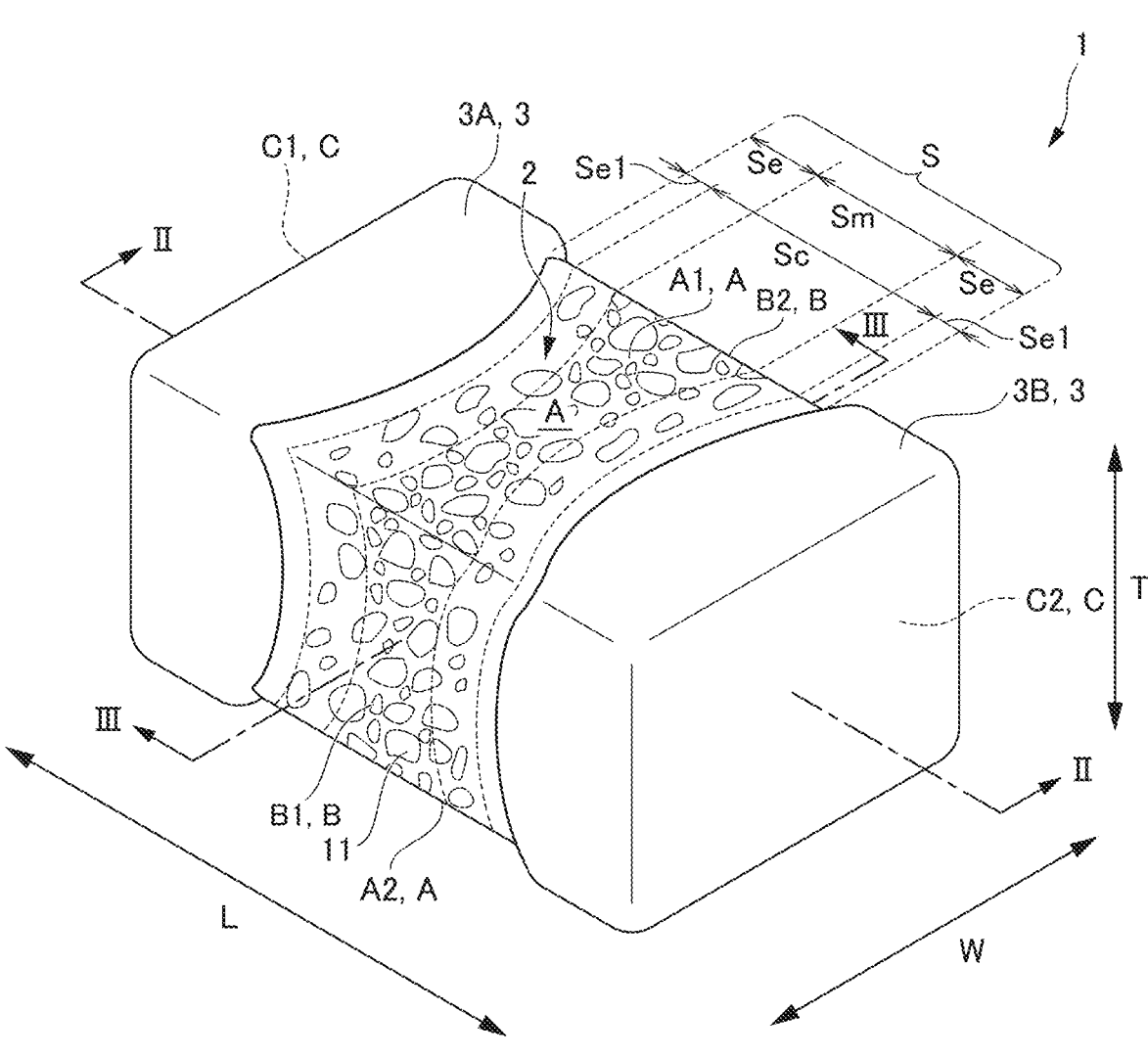
FIG. 1 is a schematic perspective view of a multilayer ceramic capacitor 1 according to an example embodiment of the present invention.
Figure 2:
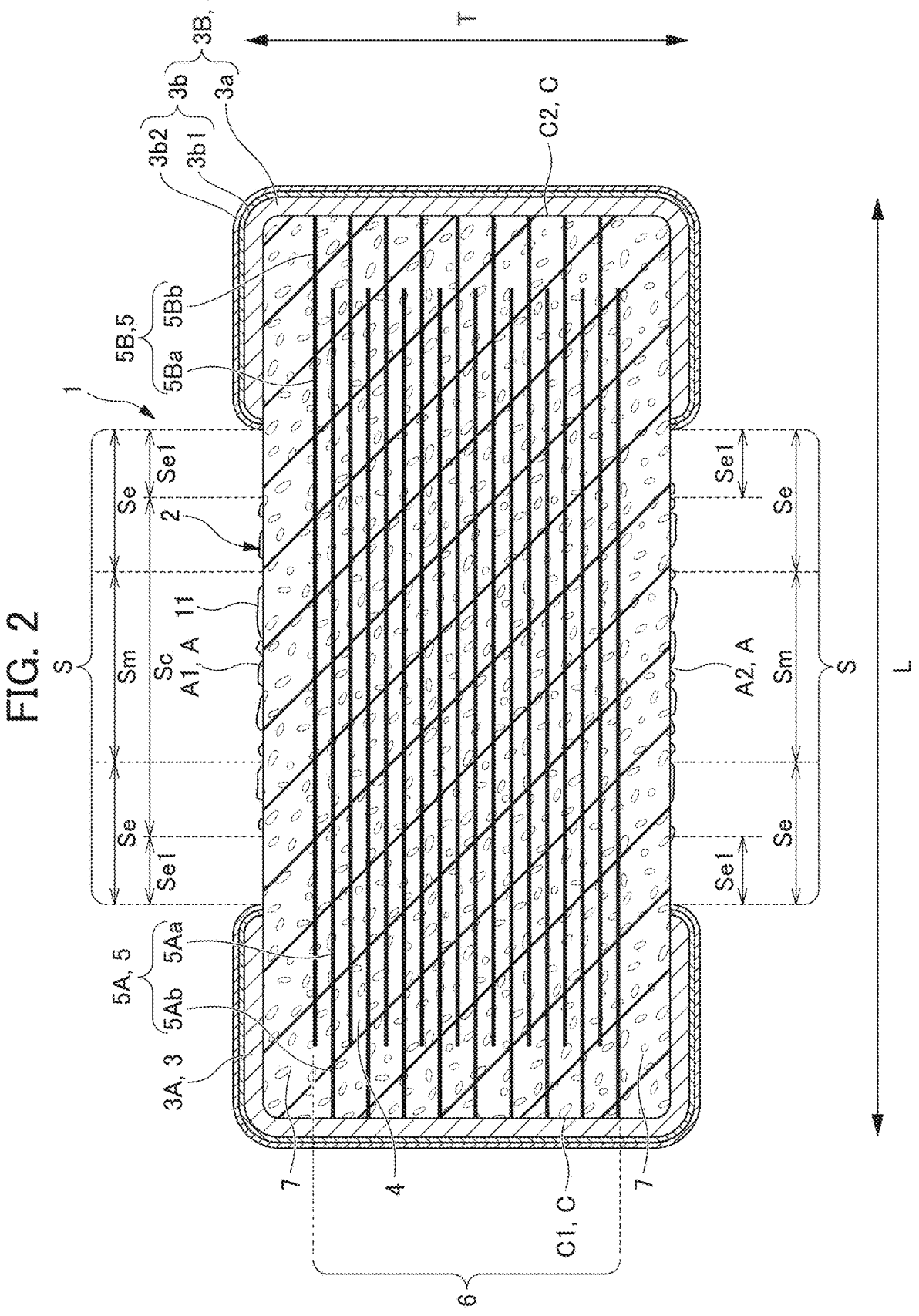
FIG. 2 is a cross-sectional view of the multilayer ceramic capacitor 1 taken along the line II-II of FIG. 1.
Figure 3:
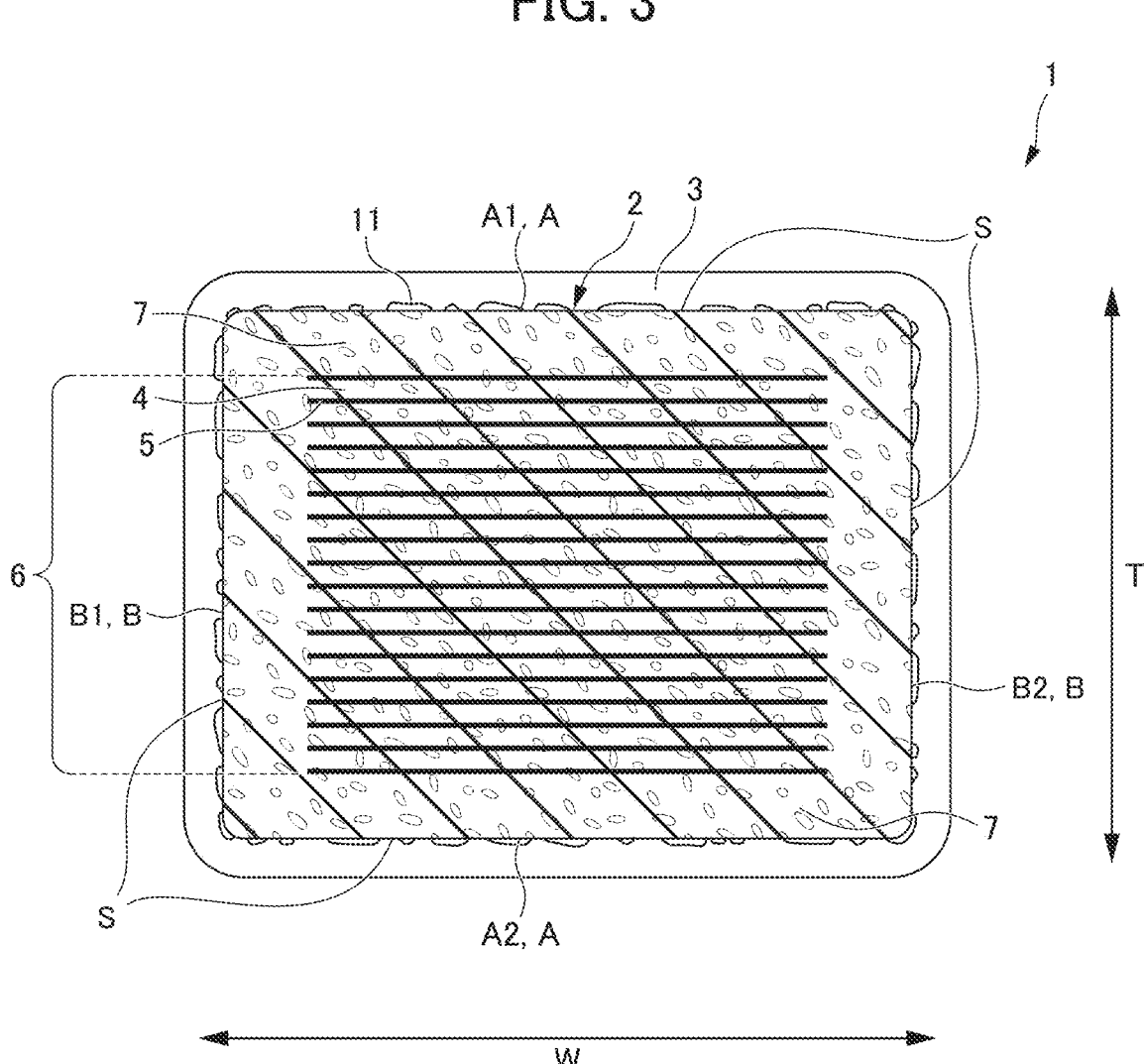
FIG. 3 is a cross-sectional view of the multilayer ceramic capacitor 1 taken along the line III-III of FIG. 1.

Hereinafter, a multilayer ceramic capacitor 1 according to an example embodiment of the present invention will be described. FIG. 1 is a schematic perspective view of a multilayer ceramic capacitor 1 according to an example embodiment of the present invention. FIG. 2 is a cross-sectional view of the multilayer ceramic capacitor 1 taken along the line II-II of FIG. 1. FIG. 3 is a cross-sectional view of the multilayer ceramic capacitor 1 taken along the line III-III of FIG. 1.

Multilayer Ceramic Capacitor 1

The multilayer ceramic capacitor 1 has a rectangular or substantially rectangular parallelepiped shape, and includes a multilayer body 2 and a pair of external electrodes 3 each on a respective one of both ends of the multilayer body 2. The multilayer body 2 includes an inner layer portion 6 including a plurality of dielectric layers 4 and a plurality of internal electrode layers 5 that are laminated.

In the following description, the terms indicating the orientation of the multilayer ceramic capacitor 1 are as follows. A direction in which the pair of external electrodes 3 is provided in the multilayer ceramic capacitor 1 is referred to as a length direction L. A direction in which the dielectric layer 4 and the internal electrode layer 5 are laminated is referred to as a lamination (stacking) direction T. A direction intersecting both the length direction L and the lamination direction T is referred to as a width direction W. In the example embodiments, the width direction W is orthogonal or substantially orthogonal to both the length direction L and the lamination direction T.

In the following description, among the six outer peripheral surfaces of the multilayer body 2, a pair of outer peripheral surfaces opposed to each other in the lamination direction T are referred to as a first main surface A1 and a second main surface A2, a pair of outer peripheral surfaces opposed to each other in the width direction W are referred to as a first lateral surface B1 and a second lateral surface B2, and a pair of outer surfaces opposed to each other in the length direction L are referred to as a first end surface C1 and a second end surface C2. In addition, the first main surface A1 and the second main surface A2 are collectively referred to as a main surface A when it is unnecessary to particularly distinguish from each other, the first lateral surface B1 and the second lateral surface B2 are collectively referred to as a lateral surface B when it is unnecessary to particularly distinguish from each other, and the first end surface C1 and the second end surface C2 are collectively referred to as an end surface C when it is unnecessary to particularly distinguish from each other.

Multilayer Body 2

The multilayer body 2 includes an inner layer portion 6 and outer layer portions 7 each provided on a respective one of both main surfaces A of the inner layer portion 6.

Inner Layer Portion 6

The inner layer portion 6 includes a plurality of dielectric layers 4 and a plurality of internal electrode layers 5 that are laminated.

Dielectric Layer 4

Each of the dielectric layers 4 is made of a ceramic material such as barium titanate, for example.

Internal Electrode Layer 5

The internal electrode layers 5 include a plurality of first internal electrode layers 5A and a plurality of second internal electrode layers 5B. The first internal electrode layers 5A and the second internal electrode layers 5B are alternately provided. In addition, the first internal electrode layers 5A and the second internal electrode layers 5B are collectively described as the internal electrode layer 5 when it is unnecessary to particularly distinguish from each other.

Each of the first internal electrode layer 5A includes a first counter portion 5Aa opposed to the second internal electrode layer 5B, and a first extension portion 5Ab extending from the first counter portion 5Aa toward the first end surface C1. The first extension portion 5Ab includes an end portion which is exposed at the first end surface C1 and is electrically connected to a first external electrode 3A described later. The second internal electrode layer 5B includes a second opposing portion 5Ba opposed to the first internal electrode layer 5A, and a second extension portion 5Bb extending from the second opposing portion 5Ba toward the second end surface C2. The second extension portion 5Bb includes an end portion which is electrically connected to a second external electrode 3B described later.

Electric charge is accumulated in the first counter portions 5Aa of the first internal electrode layers 5A and the second counter portions 5Ba of the second internal electrode layers 5B, thus defining and functioning as a capacitor.

Outer Layer Portion 7

Each of the outer layer portions 7 is made of the same ceramic material such as, for example, barium titanate as that of the dielectric layers 4 of the inner layer portion 6.

External Electrode 3

The external electrodes 3 include a first external electrode 3A on the first end surface C1 of the multilayer body 2 and a second external electrode 3B on the second end surface C2 of the multilayer body 2. In addition, the first external electrode 3A and the second external electrode 3B are collectively described as the external electrode 3 when it is not necessary to particularly distinguish them from each other. Each of the external electrodes 3 covers not only the end surface C, but also a portion of the main surface A and a portion of the lateral surface B which are adjacent to the end surface C.

Each of the external electrodes 3 includes a base electrode layer 3a and a plated layer 3b disposed outside the base electrode layer 3a. The base electrode layer 3a is electrically connected to each end of the extension portions 5Ab and the extension portions 5Bb of the internal electrode layers 5 exposed at the end surface C. The plated layer 3b includes, for example, a Ni plated layer 3b1 that covers the surface of the base electrode layer 3a and a Sn plated layer 3b2 that covers the Ni plated layer 3b1. The Ni plated layer 3b1 prevents the base electrode layer 3a from being eroded by solder. Since the solder wettability of the Sn plated layer 3b2 is improved when the multilayer ceramic capacitor 1 is mounted on the wiring substrate, the mounting of the Sn plated layer 3b2 is facilitated.

In the present example embodiment, the outer layer portions 7 and the dielectric layers 4 are each made of a dielectric ceramic material such as, for example, barium titanate as described above, and are fired in a firing step described later. During firing, the outer layer portions 7 and the dielectric layers 4 become grains, and voids (pores) are generated between the grains. In particular, the voids between grains in the outer layer portions 7 may become an intrusion path of moisture from the outside, and the moisture resistance reliability of the multilayer ceramic capacitor 1 is reduced.

The multilayer body 2 includes exposed surfaces S that are exposed from the external electrodes 3, i.e., uncovered by the external electrodes 3, on the main surface A and the lateral surface B. In the present example embodiment, each of the exposed surfaces S is coated with a metal oxide 11 different from a component of the dielectric layers 4. The metal oxide 11 does not coat the entire exposed surfaces S without any gap, but coats the exposed surfaces S in a scattered manner on the exposed surface S. The metal oxide 11 preferably coats at least the exposed surface of the main surface A. In the present example embodiment, the metal oxide 11 coats the exposed surfaces S of the main surface A and the exposed surfaces S of the lateral surface B.

As shown in FIGS. 1 and 2, each of the exposed surfaces S includes a central region Sm and two end regions Se positioned next to the central region Sm and adjacent to the external electrode 3 in the length direction L. Although not limited thereto, in the present example embodiment, when the dimension of the exposed surface S in the length direction L is divided into three substantially equal portions, the middle portion is the central region Sm, and both sides thereof are the end regions Se. The coverage of the metal oxide 11 is larger in the central region Sm than in each of the end regions Se.

When the oxidation of the metal oxide 11 is insufficient or undergoes reduction, a short circuit may occur between the metal oxide 11 and one of the external electrodes 3. According to the present example embodiment, the coverage of the metal oxide 11 in the two end regions Se located on the side of the external electrode 3 is lower than the coverage of the metal oxide 11 in the central region Sm. Therefore, even when oxidation in the metal oxide 11 is insufficient or undergoes reduction, a possibility that a short circuit occurs between one of the external electrodes 3 and the metal oxide 11 is low.

On the other hand, since the coverage of the metal oxide 11 in the central region Sm is higher than the coverage of the metal oxide 11 in each of the end regions Se, the advantageous effects of preventing moisture from entering the voids from the outside is high, and the probability of failure (short circuit) due to moisture intrusion is reduced.

Further, it is preferable that the edge portion of each of the end regions Se adjacent to the external electrode 3 includes a non-coated region Se1 which is not coated with the metal oxide 11. With such a configuration, even when the oxidation of the metal oxide 11 is insufficient or undergoes reduction, the possibility of occurrence of a short circuit with the external electrode 3 can be further reduced. In addition, a portion of the end region Se other than each of the non-coated regions Se1 that is not coated with the metal oxide 11 may have a lower coverage of the metal oxide 11 than that of the central region Sm.

The distance in the length direction of each of the non-coated region Se1 which is not coated with the metal oxide 11, that is, the distance in the length direction from the edge of each of the external electrodes 3 to the edge of a metal oxide coating region Sc is preferably, for example, about 50 μm or more and about 200 μm or less. Each of the non-coated regions Se1 on the main surfaces A may be a curved region extending in the width direction W and having a constant or substantially constant distance in the length direction along the edge of each of the external electrodes 3. Each of the non-coated regions Se1 on the lateral surfaces B may be a curved region extending in the lamination direction T and having a constant or substantially constant distance in the length direction along the edge of each of the external electrodes 3. With such a configuration, the possibility of the occurrence of a short circuit can be reduced more effectively.

The metal oxide 11 is preferably provided uniformly or substantially uniformly over the entire or substantially the entire surface of the central region Sm. By providing the metal oxide 11 uniformly or substantially uniformly over the entire or substantially the entire surface of the central region Sm, it is possible to more reliably obtain the advantageous effects of reducing the failure (short) probability due to moisture intrusion.

The exposed surface S includes a metal oxide coating region Sc coated with the metal oxide 11. In an example embodiment of the present invention, the exposed surface S includes the metal oxide coating region Sc and the non-coated regions Se1. The metal oxide coating region Sc is a region other than the non-coated regions Se1 in the exposed surface S. The coverage of the metal oxide 11 in the metal oxide coating region Sc is preferably, for example, about 10% or more and about 30% or less. When the coverage is less than about 10%, the adhesion amount of the metal oxide 11 is small, the advantageous effects of reducing or preventing moisture penetration is not sufficient, and the advantageous effects of improving moisture resistance reliability cannot be obtained. On the other hand, when the coverage is more than about 30%, the metal oxide 11 is ionized by moisture penetration, such that migration by metal ions or oxide ions occurs, and there is a risk of short circuit. However, in the present example embodiment, since the coverage of the metal oxide 11 on the entire exposed surface S is about 10% or more and about 30% or less, it is possible to sufficiently reduce or prevent moisture penetration and reduce or prevent the risk of short circuit due to occurrence of migration by metal ions or oxide ions.

The metal oxide 11 is preferably a metal oxide 11 different from a component of the dielectric layers 4, and is preferably, for example, SnO. With such a configuration, it is possible to obtain the advantageous effects of remarkably lowering the probability of failure (short) due to moisture intrusion.

As described above, when the exposed surface S of the multilayer body 2 is coated with the metal oxide 11 different from a component of the dielectric layers 4, the voids (pores) are coated, such that the probability of failure (short circuit) due to moisture penetration is reduced, and moisture resistance reliability can be improved.

Method for Measuring Coverage of Metal Oxide 11

The coverage of the metal oxide 11 is measured as follows, for example. First, observation using a scanning microscope (SEM) and acquisition of an element mapping image using an energy dispersive X-ray analyzer (EDX) attached to the SEM are performed. Next, based on the element mapping image, a portion coated with the metal oxide 11 and a portion not coated with the metal oxide 11 on the exposed surface S of the dielectric layers 4 (outer layer portions), which are exposed from the external electrodes 3, on the main surface of the multilayer ceramic capacitor 1, are determined by binarization. Then, the ratio of the area occupied by the coating portion of the metal oxide 11 to the entire area determined by the binarization is obtained, and this ratio is used as the coverage. The coverage is measured at the center of the central region Sm and at the center of the two end regions.

Method of Manufacturing Multilayer Ceramic Capacitor 1

Figure 4:
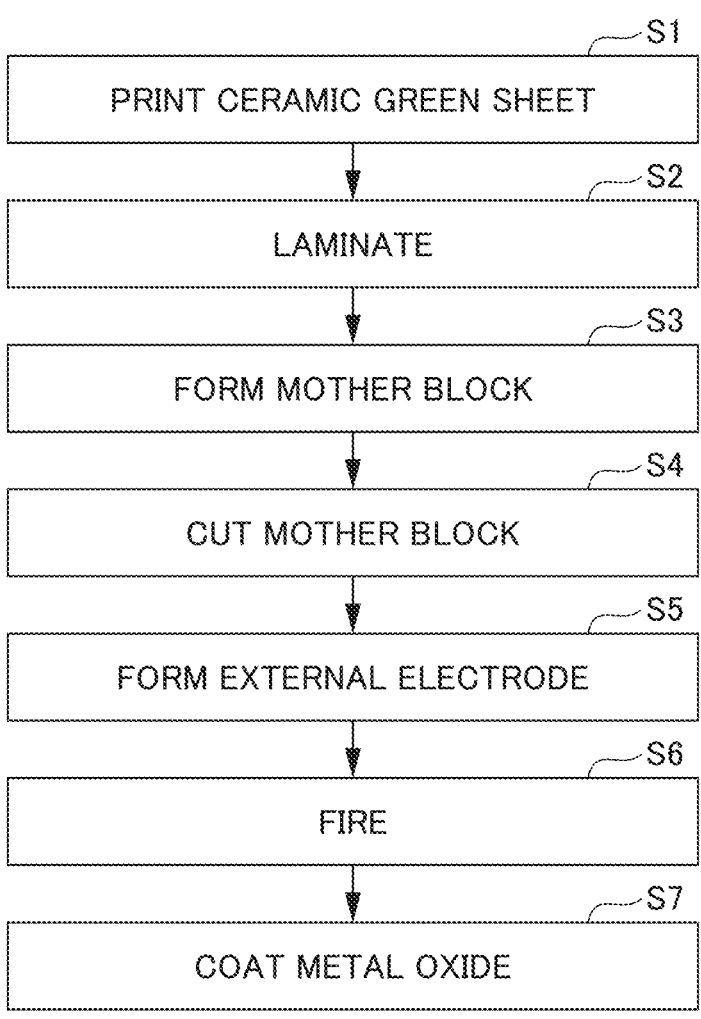
FIG. 4 is a flowchart of a method of manufacturing the multilayer ceramic capacitor 1 according to an example embodiment of the present invention.

Next, an example of a method of manufacturing the multilayer ceramic capacitor 1 will be described. The method of manufacturing the multilayer ceramic capacitor 1 of the present example embodiment is not limited as long as the above-described requirements are satisfied. However, a preferred manufacturing method includes the following steps. FIG. 4 is a flowchart of a method of manufacturing the multilayer ceramic capacitor 1.

Ceramic Green Sheet Printing Step S1

A ceramic slurry including a ceramic powder, a binder, and a solvent is applied to a carrier film in the form of a sheet.

Subsequently, an electrically conductive paste including a metal powder, a binder, an additive such as, for example, a plasticizer or a dispersant, an organic solvent, or the like is printed on the ceramic green sheet by, for example, screen printing, ink jet printing, gravure printing or the like so as to have a belt pattern. With such a configuration, the electrically conductive paste for the internal electrode layers 5 is printed on the surface of the ceramic green sheet defining the dielectric layers 4.

Lamination Step S2

The plurality of ceramic green sheets are stacked such that the electrically conductive paste is shifted by about a half pitch in the length direction L between the ceramic green sheets adjacent to each other in the lamination direction T. Further, the ceramic green sheets for forming the outer layer portions 7 are stacked on both sides in the lamination direction T of the plurality of laminated ceramic green sheets.

Mother Block Formation Step S3

Subsequently, the ceramic green sheets for forming the outer layer portions 7 are stacked on both sides of the plurality of laminated ceramic green sheets in the lamination direction T, and the stacked ceramic green sheets for forming the outer layer portions 7 are thermocompression bonded to form a mother block.

Mother Block Cutting Step S4

Next, the mother block is cut to manufacture a plurality of multilayer bodies 2.

External Electrode Forming Step S5

The electrically conductive paste for the base electrode layers 3a of the external electrodes 3 is applied to both end portions of the multilayer body 2 by dipping or the like.

Firing Step S6

Then, the multilayer body 2 is heated at a set firing temperature in a nitrogen atmosphere for a predetermined time, and the base electrode layers 3a of the external electrodes 3 are fired on the multilayer body 2.

Metal Oxide Coating Step S7

The manufactured multilayer ceramic capacitor 1 is plated in a plating bath in which debris of a predetermined metal oxide 11 is intentionally mixed to form the plated layer 3b, and the surface of the element body is coated with the metal oxide 11. Then, the metal oxide 11 in the vicinity of each of the external electrodes 3 is removed by, for example, a laser. Through the above steps, the multilayer ceramic capacitor 1 shown in FIG. 1 is manufactured.

Although example embodiments of the present invention have been described above, the present invention is not limited to the example embodiments described above, and various changes and modifications thereto as follows are possible.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including an inner layer portion including a plurality of dielectric layers and a plurality of internal electrode layers that are laminated, two main surfaces opposed to each other in a lamination direction, two lateral surfaces opposed to each other in a width direction intersecting the lamination direction, two end surfaces opposed to each other in a length direction intersecting the lamination direction and the width direction, and two outer layer portions on both sides of the inner layer portion in the lamination direction; and external electrodes respectively on each of the two end surfaces of the multilayer body; wherein the multilayer body includes an exposed surface that is not covered by the external electrodes;

the exposed surface includes a metal oxide coating region coated with a metal oxide which is different from a component of the plurality of dielectric layers;

the exposed surface includes a central region and two end regions that are each on a respective one of both sides of the central region and each adjacent to a respective one of the external electrodes in the length direction;

a dimension in the length direction of each of the central region and the two end regions are equal or substantially equal to one another; and a coverage of the metal oxide is larger in the central region than in each of the end regions.

2. The multilayer ceramic capacitor according to claim 1, wherein each of the end regions includes a region that is not coated with the metal oxide.

3. The multilayer ceramic capacitor according to claim 1, wherein the metal oxide is provided uniformly or substantially uniformly over an entire or substantially an entire surface of the central region.

4. The multilayer ceramic capacitor according to claim 1, wherein the coverage of the metal oxide in the metal oxide coating region is about 10% or more and about 30% or less.

5. The multilayer ceramic capacitor according to claim 1, wherein the metal oxide is SnO.

6. The multilayer ceramic capacitor according to claim 1, wherein each of the plurality of dielectric layers includes barium titanate.

7. The multilayer ceramic capacitor according to claim 1, wherein each of the two outer layer portions includes barium titanate.

8. The multilayer ceramic capacitor according to claim 1, wherein each of the external electrodes includes a base electrode layer and a plated layer on the base electrode layer.

9. The multilayer ceramic capacitor according to claim 8, wherein the plated layer includes a Ni plated layer covering the base electrode layer and a Sn plated layer covering the Ni plated layer.

10. The multilayer ceramic capacitor according to claim 1, wherein each of the end regions includes an end portion that is not coated with the metal oxide.

11. The multilayer ceramic capacitor according to claim 10, wherein a distance in the length direction from the edge portion that is not coated with the metal oxide and an edge of one of the external electrodes is about 50 μm or more and about 200 μm or less.

* * * * *